Figure 1:
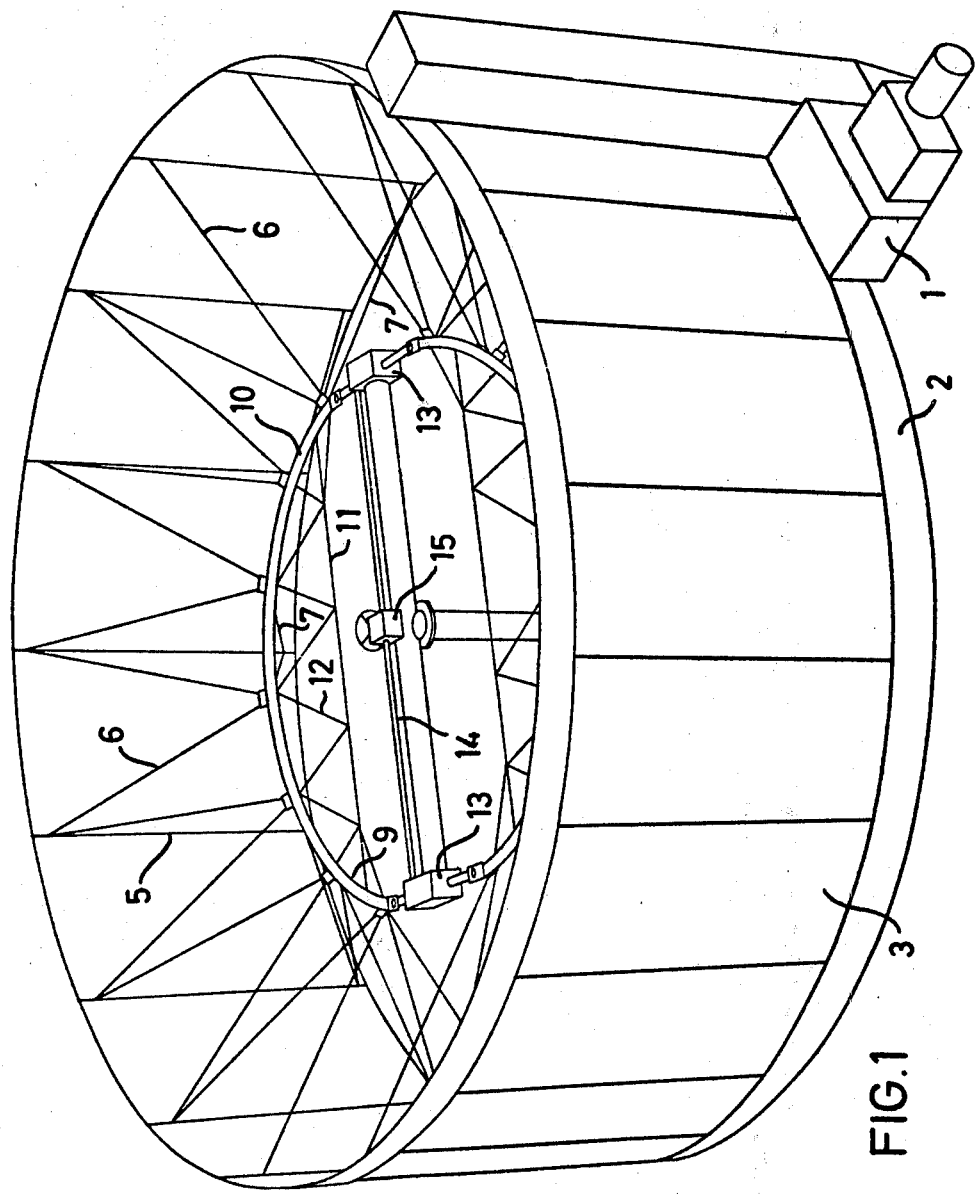

United States Patent [19]

Selden et al.

[11] 4,177,032

[45] Dec. 4, 1979

[54] MOLDING CORE FOR THE MANUFACTURE OF HOLLOW BODIES CONSISTING OF FIBER-REINFORCED SYNTHETIC RESIN

[75] Inventors: Peter H. Selden, Ludwigshafen; Joachim Duerkop, Frankenthal; Wolfgang Albrecht, Ludwigshafen; Heinz Weissenmayer, Boehl-Iggelheim, all of Fed. Rep. of Germany

[73] Assignee: BASF Aktiengesellschaft, Fed. Rep. of Germany

[21] Appl. No.: 845,720

[22] Filed: Oct. 26, 1977

[30] Foreign Application Priority Data

Nov. 20, 1976 [DE] Fed. Rep. of Germany ....... 2652862

[51] Int. Cl.² ............................................... B29C 1/12
[52] U.S. Cl. .................................... 425/468; 249/181; 249/184; 249/185
[58] Field of Search ............................... 425/403, 468; 242/110.1, 110.2; 249/184, 185, 181, 180

[56] References Cited

U.S. PATENT DOCUMENTS

| 929,694 | 8/1909 | Noah ............................ 249/184 X |
| 933,327 | 9/1909 | McMahon ............................ 249/185 |
| 952,869 | 3/1910 | Besser ................................ 249/181 |
| 2,344,738 | 3/1944 | Seifert ................................ 249/184 |
| 2,359,471 | 10/1944 | Ewing ................................ 249/181 |
| 2,707,814 | 5/1955 | Francis et al. ...................... 249/181 |

Primary Examiner—Robert L. Spicer, Jr.
Attorney, Agent, or Firm—Keil & Witherspoon

[57] ABSTRACT

A molding core, consisting of a plurality of flexible metal plates, for the manufacture of cylindrical hollow bodies or wound sections of fiber-reinforced synthetic resin. The metal plates are fixed to support members which in turn are connected to frames. To release the hollow bodies or wound sections, two diametrically opposed metal plates can be tilted inward and the frames can be moved toward one another by means of a common drive. It is possible to assemble a plurality of hollow bodies or wound sections to form vessels of large volume.

1 Claim, 3 Drawing Figures

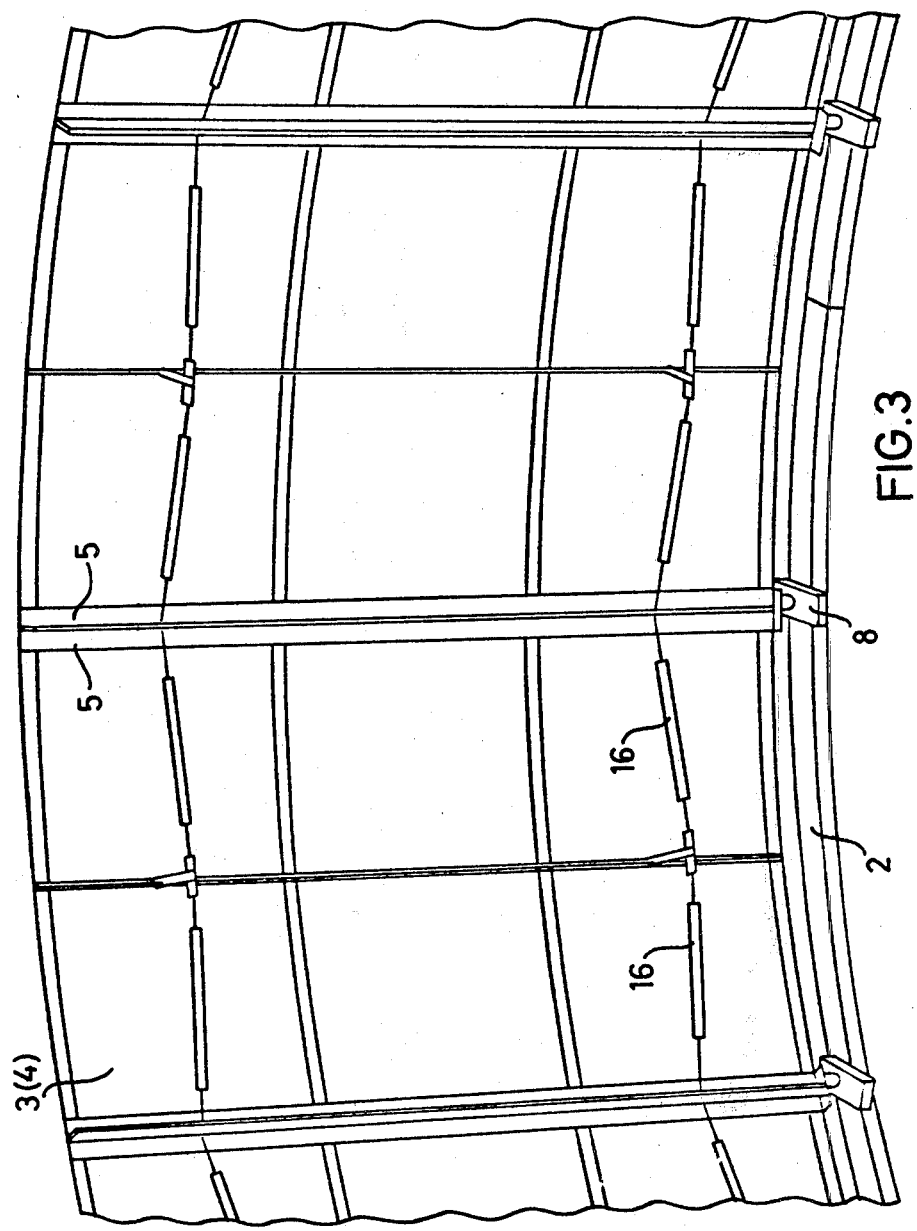

MOLDING CORE FOR THE MANUFACTURE OF HOLLOW BODIES CONSISTING OF FIBER-REINFORCED SYNTHETIC RESIN

The present invention relates to a molding core for the manufacture of hollow bodies, consisting of fiber-reinforced synthetic resin, of various internal diameters, which core consists of a plurality of flexible metal plates which are fixed to support members, are arranged next to one another and are connected to one another by detachable connecting members, the curvature of the metal plates being adjustable by means of tensioning devices engaging on the lateral edges.

In a conventional molding core of this type of construction, disclosed in German Patent No. 740,494, the metal plates consist of preformed sheet metal strips which are assembled on the unit construction principle and are detachably connected to one another by connecting members provided at their lateral edges. If cylindrical hollow bodies of different diameters are to be manufactured by means of such a molding core, it is necessary to use sheet-metal strips of different shapes, to correspond to the different diameters, so that a large stock of strips of different shapes is required.

Further, German Published Application DAS 1,779,451 discloses a molding core for the manufacture of plastic hollow bodies, which core can be dismantled and consists of several flexible metal plates of identical shape. To deal with different internal diameters of the hollow bodies, the number of plates and at the same time their curvature—adjusted by means of tensioning devices—are matched to the particular requirements. The plates are fastened to support members which in turn are connected to rods, the length of which can be varied in accordance with the radius of curvature of the plates. However, when releasing the hollow bodies, and when changing the size of the core diameter, this construction proves to require a great deal of time and labor and is therefore, all in all, uneconomical. Furthermore, the molding core must stand on the floor whilst the winding device has to be guided round the core. Accordingly, a larger foundation and more floor space are required, which greatly reduces the applicability of such molding cores.

It is an object of the present invention to improve a molding core of this type, consisting of several metal plates, so that the release of the hollow body and the change in the core diameter can be effected more simply and the core is widely applicable.

This object is achieved according to the invention if two diametrically opposed metal plates can be tilted inward, the support members of the metal plates located between them are fixed to a frame, and the frames can be moved toward one another by a common drive.

The advantages of this molding core are that the time required to release a finished wound section, and the setting-up time for preparing the core for the production of the next wound section becomes so short that the core can be utilized very economically. Additional downtime or time needed for partially dismantling the molding core to release the finished wound section are dispensed with, so that the capacity of a vertical winding unit can be increased substantially, which is a decisive factor in the cost of flat-bottomed tanks made from fiber-reinforced synthetic resins.

According to a further feature of the invention, the plates are located on a rotatable annular platform, which in particular has space advantages when using the molding core.

An embodiment of the molding core according to the invention is shown schematically in the accompanying drawings and explained in more detail below.

Figure 2:
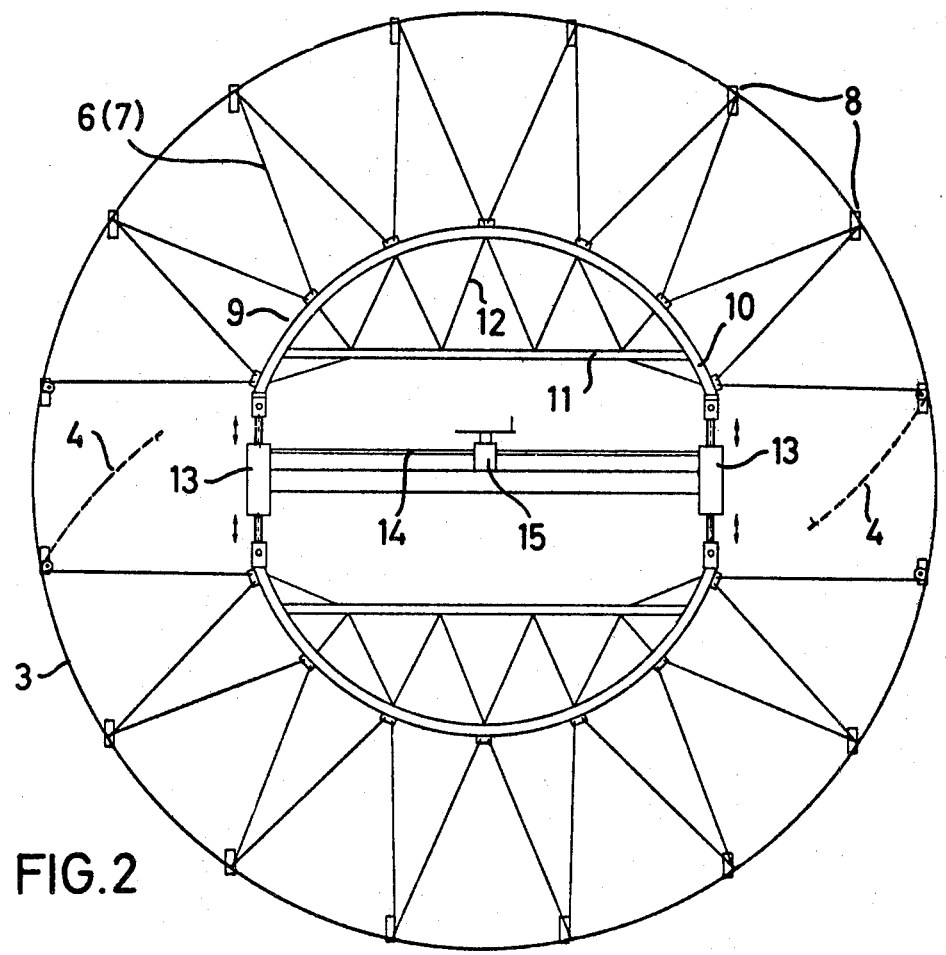

FIG. 1 shows a perspective view and
FIG. 2 a plan view of the molding core, whilst
FIG. 3 shows a perspective view of several mounted metal plates.

The molding core consists essentially of a plurality of flexible plates 3, 4, located on a rotatable annular platform 2. The plates are in general of rectangular shape and have angle profiles 5 at their vertical, long lateral edges. The plates are assembled, to form a rotationally symmetrical body, by means of the members, such as screws, which connect the angle profiles. The angle profiles rest on spherical bases and are guided in slide rails 8 which are fixed parallel to one another on the platform 2.

Two plates which can be tilted inward are marked 4. These are advantageously located diametrically opposed, so that the molding core is subdivided into two halves. Each of the rotatable metal plates 4 is hingedly connected, like a door, to the adjacent metal plate 3. The rotatable plate 4, when closed, is detachably locked to the other adjacent plate 3 in the manner of a door lock. This relationship is best illustrated by FIG. 2. The plates 3 located between them are each connected to a frame 9 via support members 6 and 7. For adjustment of the molding core, the length of the support members 6/7 can be varied.

Depending on the radius of curvature and the number of the metal plates 3, there are obtained mold cores of different diameters. For each diameter support members 6, 7 of a specific length are required. The support members may consist of a tubular part and a solid rod whose outer diameter is slightly smaller than the inner diameter of the tube. By introducing the rod into the tube it is possible to vary the length of the support members 6 and 7. Both rod and tube are provided with holes arranged vertically to their longitudinal axes and in various places along their length so that they can be fixed together in various positions by means of pins.

The frame 9 consists of a pipe 10, bent roughly into a semi-circle, and a crossbar 11, and in addition comprises several struts 12, to provide strength. The two frames are connected to one another by two double-acting jack screws 13. A central screw shaft 14 acts on these jack screws and moves the two mold halves, connected to one another by means of the frame 9 and the support members 6/7, toward one another by an electrical or manual drive 15 or the like. When the frames 9 are moved, the spherical bases of metal plates 3 move inwardly or outwardly in slide rails 8.

For molding cores of large diameter, an appropriate number of plates of little curvature are used, whilst for small cores the plates must be more curved. The curvature is adjusted by means of tensioning means 16 which engage on the lateral edges of the plates. Examples of tensioning means are those specified in DIN No. 1,478.

As is best illustrated by FIGS. 1 and 3, the mold core rests on platform 2, the diameter of which is slightly larger than the largest possible diameter of the core. The platform is mounted on a vertical rotatable shaft and is supported on its underside and near its outer edge by several wheels, the rotation axes of which are arranged in the direction of the platform radii and which move in a ring-shaped rail. Furthermore, the platform is provided at its lower side and along its outer edge with a chain or a gear rim which engages with a motor-driven chain wheel or gear wheel so that it can be rotated.

A hollow body consisting of fiber-reinforced synthetic resin is produced as follows on the molding core described above.

At 1, the molding core is driven via a gearwheel which acts on a link chain on the outer periphery of the platform 2. Synchronously thereto, a lifting gear is driven, which moves the guide comb for the roving, being wound on the core, vertically up and down over the entire winding height, in a certain ratio to the circumferential speed of the molding core or the platform. The mixing and metering of the synthetic resin, the impregnation of the rovings with resin and the application of mats and fabrics to the molding core are carried out in the conventional manner.

After the laminate has cured, the wound section is trimmed at both edges and the diameter of the molding core is then reduced. For this purpose, the plates 4 are unlocked and tilted inward. The frames 9, and accordingly the two mold halves consisting of the plates 3, can now be moved toward the center of the core by means of the drive 15 and the contral screw shaft 14 (FIG. 2), the angle profiles 5 fixed to the plates 3 being guided in slide rails 8 which are parallel to one another.

The finished wound section is lifted by means of a lifting tackle and placed down on the previously prepared bottom of a hollow body. Further wound sections can then be placed on this first section, so that hollow bodies with a volume of from about 100 to about 5,000 m$^3$ can be achieved. The individual parts are connected to one another by means of pipe sockets, i.e. portions of increased diameter at one end of a wound section, which portions have been suitably shaped during the production of the wound section.

We claim:

1. An internal molding core for the manufacture of hollow, fiber-reinforced synthetic resin bodies of various diameters, said molding core comprising:

a plurality of curved rectangular flexible metal plates which are positioned in a circular arrangement with their vertical side edges abutting one another, detachable connecting members interconnecting said abutting vertical side edges, tensioning means interconnecting the vertical side edges of each flexible metal plate in a manner so as to permit the radius of curvature of said plates to be adjusted, two of said flexible metal plates which are diametrically opposed to each other and which devide said molding core into two halves being hinged along one vertical side edge thereof so as to permit their inward rotation toward the center of said molding core, a pair of frames which vertically and inwardly support the flexible metal plates located on each molding half by means of adjustable support members extending between each frame and the flexible metal plates between said opposed rotatable plates which comprise each of said molding halves, and a common drive means interconnecting said frames which allows said frames to be moved toward one another after said opposed rotatable plates have been inwardly rotated in a manner so as to reduce the distance between said molding halves and permit said hollow body to be removed from about said molding core, said flexible metal plates being mounted about their lower edges on a rotatable, annularly-shaped platform which permits the rotation of said molding core as said hollow body is formed thereabout.

* * * * *